United States Patent [19]

Dines

[11] Patent Number: 4,778,099

[45] Date of Patent: Oct. 18, 1988

[54] SOLDERING METHOD AND APPARATUS

[75] Inventor: David R. Dines, Oklahoma City, Okla.

[73] Assignee: American Telephone and Telegraph Company, AT&T Technologies, Inc., Berkeley Heights, N.J.

[21] Appl. No.: 129,637

[22] Filed: Dec. 7, 1987

[51] Int. Cl.$^4$ .................... B23K 31/02; H05K 3/34
[52] U.S. Cl. ............................ 228/180.2; 228/207; 228/225; 228/260; 228/37; 228/43; 228/47
[58] Field of Search ............... 228/180.2, 180.1, 201, 228/207, 223, 225, 257, 260, 261, 37, 43, 47

[56] References Cited

U.S. PATENT DOCUMENTS

| | | | |
|---|---|---|---|
| 1,677,248 | 7/1928 | Reinbold | 228/37 |
| 3,724,418 | 4/1973 | McLain | 228/37 |
| 3,825,164 | 7/1974 | Sarnacki et al. | 228/37 |
| 3,982,047 | 9/1976 | Braden | 228/47 |
| 4,011,980 | 3/1977 | Dvorak et al. | 228/37 |
| 4,363,434 | 12/1982 | Flury | 228/37 |
| 4,566,624 | 1/1986 | Comerford | 228/37 |
| 4,583,674 | 4/1986 | Dines et al. | 228/102 |

FOREIGN PATENT DOCUMENTS 809883  3/1959  United Kingdom ............... 228/37

OTHER PUBLICATIONS

H. A. Pohl, *The Engineer*, Third Issue, published by Western Electric, 1983, pp. 31–35.

*Primary Examiner*—Nicholas P. Godici
*Assistant Examiner*—Samuel M. Heinrich
*Attorney, Agent, or Firm*—Robert B. Levy

[57]    ABSTRACT

The present invention is directed to a method for soldering each of a plurality of members (40), arranged in one or more parallel rows, to a separate one of a plurality of metallized pads (42) on a substrate (10), each pad being contiguous with a corresponding member. The method is initiated by tilting the substrate so that one end of each row of members and the metallized pads contiguous therewith are at a higher elevation than the other end. A stream (80) of molten solder and a dripping stream (88) of flux droplets are directed onto the substrate into the regions where the members are contiguous with the metallized pads. Simultaneously, the substrate is displaced relative to the streams along a path (96) inclined with respect to the horizontal and parallel to the rows of members so that the members and the metallized pads are successively coated with solder and then flux. The inclination of the substrate is such that the solder and flux flow downwardly, under gravity, past a successive one of the members and metallized pads. The force of gravity on the solder, together with the presence of the flux, is sufficient to break the surface tension of the solder between adjacent members to prevent a solder bridge therebetween.

8 Claims, 4 Drawing Sheets

SOLDERING METHOD AND APPARATUS

TECHNICAL FIELD

This invention relates to a method and apparatus for soldering, and, more particularly, to a method and apparatus for soldering each of a plurality of contacts, arranged in one or more rows extending from an electrical connector, to a separate one of a plurality of metallized areas on a major surface of a substrate.

BACKGROUND ART

In many different types of electronic equipment, electrical interconnection of two or more circuit boards is accomplished by a device known as a backplane. A typical backplane is comprised of a substrate having a plurality of rows of selectively interconnected, electrically conductive pins extending normally from one of its major surfaces. One or more of the rows of pins are each received in a separate edge connector, each carried by, and electrically connected to a separate circuit board.

Each edge connector is comprised of an insulative housing secured to a major surface of the circuit board proximate an edge thereof. The housing typically has at least one and usually several rows of spaced apertures extending therethrough, the rows of apertures being stacked one above the other in spaced relationship so that each row is parallel to the plane of the board. The apertures in each row are sized to receive a corresponding one of the pins in a row projecting from the backplane.

Extending into each aperture in the edge connector housing is a first end of an electrical contact which makes a mechanical and electrical connection with the backplane pin received in the aperture. Each contact has a second, opposite end which extends from the housing towards one of the major surfaces of the circuit board. The second end of each contact is provided with an arcuate tip or "toe" for bearing against, and making an electrical connection with, a separate one of a plurality of metallized pads on the circuit board, each pad connected to one or more components on the board. Typically, the toes, as well as the metallized pads on the board contiguous therewith, are arranged in one or more rows which are successively spaced from the edge connector housing. As may be appreciated, the metallized pads on each circuit board are selectively interconnected to the metallized pads on one or more other circuit boards via the edge connector contacts and the backplane pins.

To assure that the electrical connection between each toe and each metallized pad remains sold, the toes are soldered to the metallized pads. In the past, soldering of the toes to the pads has been done manually. However, manually soldering the toes of the edge connector contacts to the metallized pads on the boards has become increasingly more time-consuming because of an increase in the number of toes as well as a reduction in the lateral spacing therebetween. The increase in the number of edge connector toes and the reduction in the spacing therebetween has resulted from the trend in the electronics industry towards a greater density of components on a given size circuit board. This has led to a corresponding need to increase the number of connections that must be made to the circuit board by the edge connector without a corresponding increase in the size thereof.

Recently, efforts have been made at automating the process of soldering the toes of the edge connector contacts to the metallized pads on the circuit board. One approach has been to provide a convective reflow soldering apparatus for this purpose as disclosed in the article "Assembly of Bellpac ® Connectors to Printed Wiring Boards" by Herbert A. Pohl, published in *The Western Electric Engineer,* Third Issue, Vol 47, No. 3, at pages 30–35. The Pohl soldering apparatus comprises a conveyor for transporting the circuit board past a set of heaters which direct hot air at the region where the toes of the edge connector contacts are contiguous with the metallized pads on the circuit board. A solder feeding mechanism is located downstream of the heaters for feeding solder into the region previously warned by the heaters. When the solder contacts the toe or the metallized pad contiguous therewith, the solder reflows and forms a bond between the toe and the metallized pad.

The soldering apparatus of Pohl is only useful for soldering those edge connectors having but a single row of toes, each contiguous with a separate one of a set of metallized pads lying in a single row on the circuit board. The Pohl soldering apparatus is not useful for soldering those edge connectors whose toes lie in two or more rows spaced successive distances from the edge connector housing. This is because the Pohl apparatus is generally not able to feed solder towards more than one row of toes on the edge connector at a time. Thus, during a single pass of the circuit board past the solder feeding mechanism on the Pohl apparatus, the toes lying in more than one of the rows will likely not be soldered to the corresponding metallized pads on the circuit board.

Therefore, there is a need for a technique for automated soldering of each of a plurality of edge connector toes, arranged in one or more rows, to a corresponding one of a plurality of metallized pads, arranged in a like number of rows on a circuit board.

BRIEF SUMMARY OF THE INVENTION

The foregoing disadvantage is substantially overcome by the present method for soldering each of a plurality of spaced members, arranged in at least one row, to each of a plurality of metallized pads on a substrate, each pad contiguous with a corresponding member. Initially, the substrate is tilted so that one end of the row of members and the metallized pads contiguous therewith is at a higher elevation than the other end thereof. A stream of wetting agent (i.e., liquid flux) and a stream of bonding material (i.e., molten solder) are then directed onto the substrate into the regions where the metallized pads are contiguous with the members. The width of each stream is such as to exceed the combined width of the rows of metallized pads on the substrate. Simultaneously with the streams being directed at the substrate, a relative motion is imparted between the substrate and the streams such that substrate traverses the streams along a path inclined with respect to the horizontal and parallel to the row of metallized pads on the substrate. As the substrate traverses the streams, the bonding material and wetting agent flow, under the force of gravity, downwardly past a successive one of the members in the row and the pads contiguous therewith so each member and metallized pad is successively coated with bonding material and then wetting agent. The presence of the wetting agent upstream of the bonding material, together with the force of gravity, serves to break the tension of the bonding material between adjacent members in the row, thereby preventing the formation of a bridge of bonding material therebetween. However, the capillary force exerted on the bonding material at the junction between each member and each pad is sufficient to assure that a small fillet of bonding material advantageously remains at the junction.

In accordance with another aspect of the invention, the substrate is tilted, and then a stream of bonding material and a stream of wetting agent are directed onto the substrate into the region where the members are each contiguous with a corresponding one of the metallized pads on the substrate. Simultaneously, a relative motion is imparted between the substrate and the streams so the substrate traverses the streams in a first direction along a path inclined with respect to the horizontal and parallel to the row of metallized pads on the substrate. As the substrate traverses the streams in the first direction, the members and the pads contiguous therewith are successively coated first with wetting agent and then with bonding material. In this way, the members and metallized pads are wetted before the bonding material is applied thereto. Thereafter, the direction of the relative motion between the streams and the substrate is reversed so the members and metallized pads are successively coated with bonding material and then wetting agent. In this way, the metallized pads are saturated with bonding material. As the substrate traverses the streams in both directions along the inclined path, the bonding material and the wetting agent flow under gravity downwardly past a successive one of the members in the row and the metallized pads contiguous therewith. The presence of the wetting agent upstream of the bonding material, together with the force of gravity, serves to sufficiently break the tension of the bonding material between the adjacent members in the row to prevent the formation of a bridge of bonding material therebetween. However, the capillary force exerted on the solder at the junction between each member and metallized pad is sufficient to assure that a small fillet of solder will remain at the junction.

DETAILED DESCRIPTION

Figure 1:
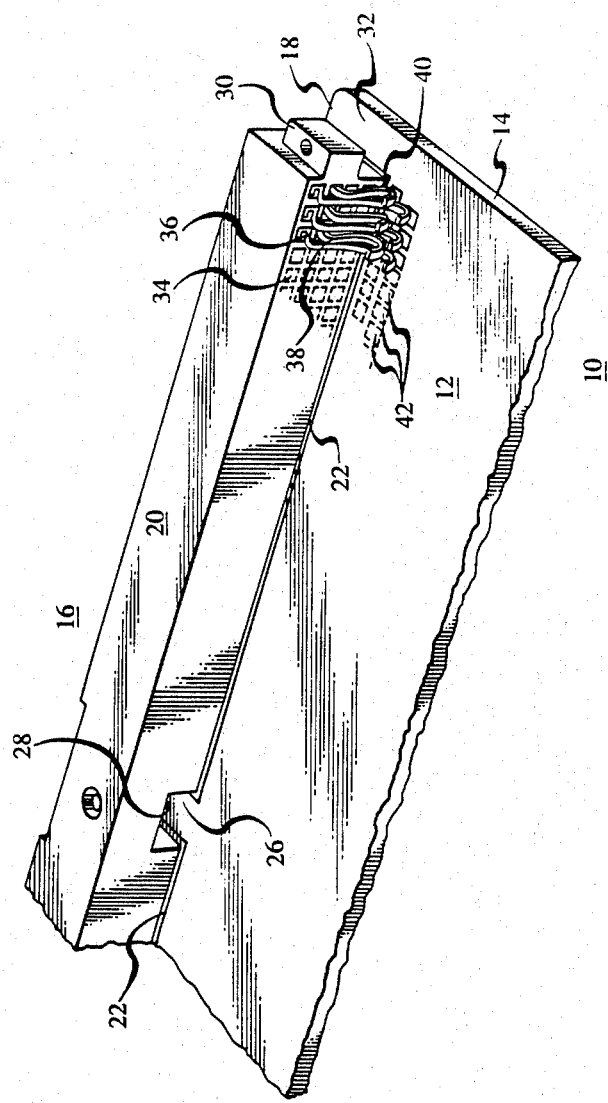
FIG. 1 is a partial perspective view of a prior art printed circuit board which carries an edge connector having a plurality of rows of toes, each contiguous with a metallized pad on the circuit board.

FIG. 1 is a partial perspective view of a prior art printed circuit board 10 having first and second major surfaces 12 and 14, respectively. An edge connector 16 is mounted to the circuit board proximate an edge 18 thereof for connecting the board to one or more other circuit boards via a back plane (not shown). In an exemplary embodiment, the edge connector 16 is comprised of an electrically insulative housing 20 shaped in the form of a quadrilateral prism. The housing 20 is sized so that portions thereof can be partially received in a separate one of a pair of cutouts 22 which extend inwardly from the edge 18 of the circuit board 10 towards the center thereof.

The cutouts 22 in the circuit board 10 are separated by a finger-like portion 26 which is sized for receipt within a notch 28 in the housing 20. The finger-like portion 26 is secured by a fastener (not shown) such as a screw or the like to the edge connector housing 20. A mounting tab 30 is provided at each end of the housing 20 for attachment by a screw (not shown) or the like, to a separate one of a set of finger-like portions 32 of the circuit board located at the ends of the cutouts 22 opposite the finger-like portion 26. When the housing 20 is attached to the circuit board 10 in the manner described, a portion of the housing protrudes beyond both of the surfaces 12 and 14 of the circuit board.

A plurality of rows of spaced apertures 34, stacked one above the other in spaced relationship, are provided though the housing 20 such that there are an equal number of rows of apertures successively spaced from the surface 12 as are spaced from the surface 14. Each of the apertures 34 in each row is parallel to the plane of the circuit board 10 and is sized to receive a backplane pin (not shown) therein. A first end 36 of an electrical contact 38 extends into each aperture 34 for making an electrical and mechanical connection with the backplane pin received in the aperture.

The end of each electrical contact 38 opposite the end 36 is provided with an arcuate tip 40, referred to as a "toe," which is contiguous with a separate one of a plurality of metallized pads 42 on a separate one of the surfaces 12 and 14 of the circuit board 10. When the housing 20 of the edge connector 26 has more than one row of apertures 34 spaced from a separate one of the surfaces 12 and 14, the toes 40 of the contacts 38, and the metallized pads 42 contiguous therewith, are typically arranged in two or more rows successively spaced laterally from the housing 20. Such an arrangement is usually necessary to prevent interference between each of the toes 40 of a pair of contacts 38, each associated with a separate one of two adjacent rows of apertures 34.

Figure 2:
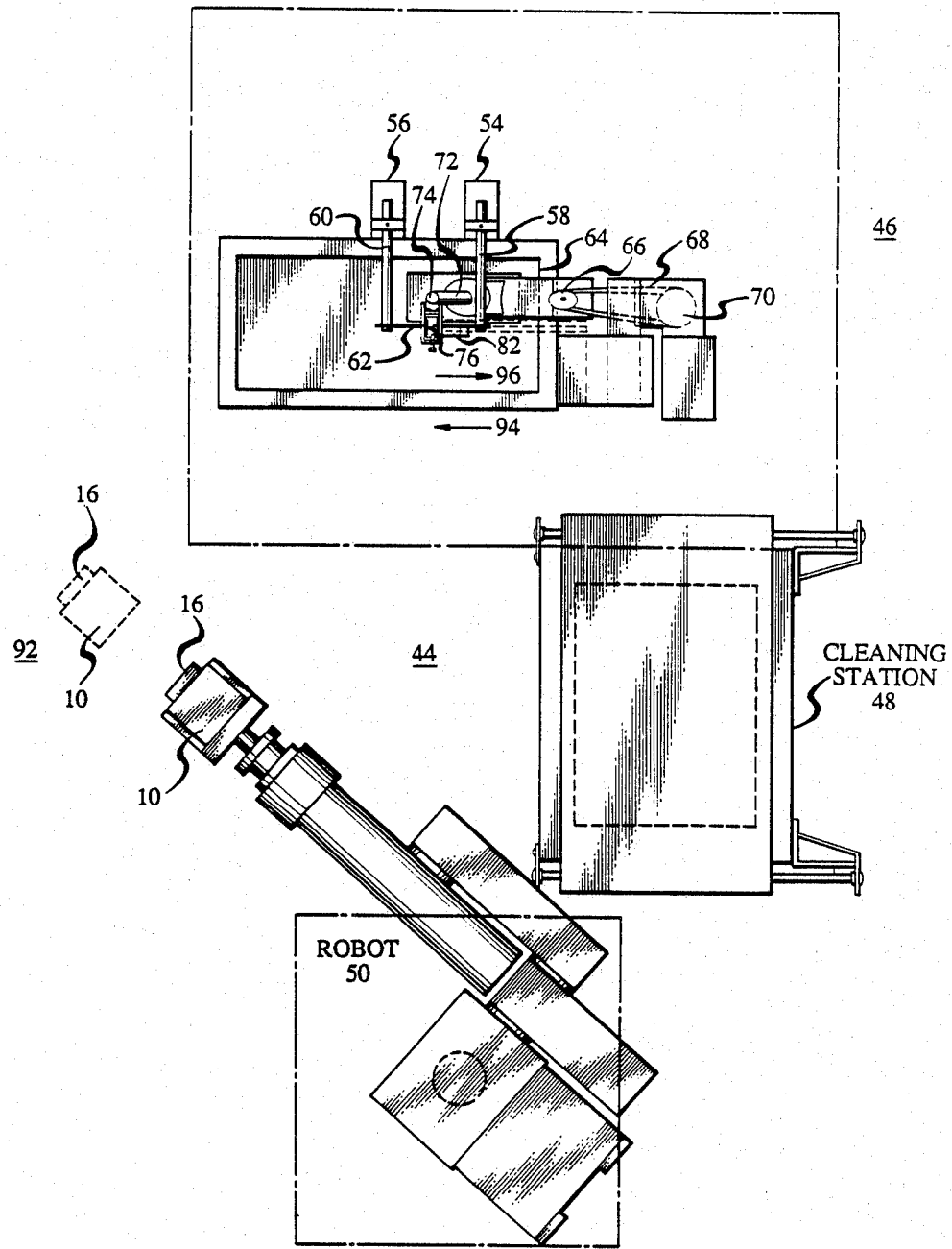
FIG. 2 is a top or plan view of system which includes a soldering machine, constructed in accordance with the present invention, for soldering the toes of the edge connector of FIG. 1 to the metallized pads on the circuit board of FIG. 1.

To assure that the connection between each of the toes 40 and each of the metallized pads 42 contiguous therewith remains a solid one, the toes are soldered to the metallized pads. FIG. 2 shows a plan view of a system 44 for automated soldering of the toes 40 of the contacts 38 to the corresponding metallized pads 42 on each of the surfaces 12 and 14 of the circuit board 10 of FIG. 1. The system 44 comprises a soldering machine 46, constructed in accordance with the invention and described in more detail hereinafter, a cleaning station 48 and a robot 50. Both the cleaning station 48 and the robot 50 are conventional in their construction and therefore will not be described in detail.

Figure 3:
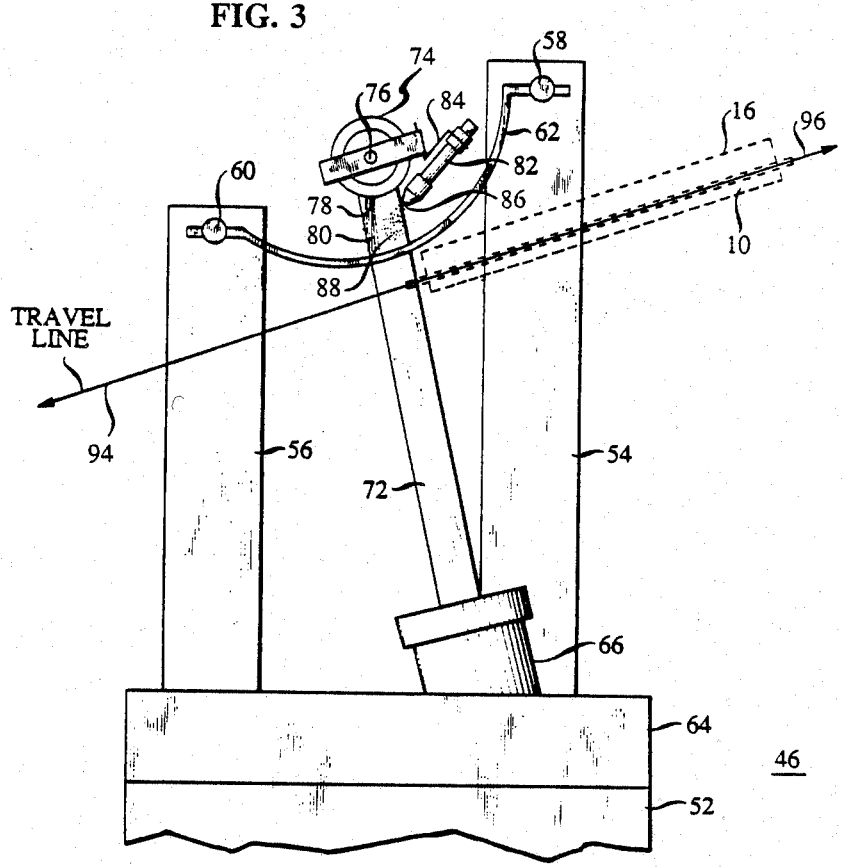
FIG. 3 is a side view of the soldering machine of FIG. 2.

Referring both to FIGS. 2 and 3, the soldering machine 46 is comprised of a base 52 (see FIG. 3) which mounts a pair of laterally spaced, vertically rising columns 54 and 56. As best seen in FIG. 3, the column 54 is of a greater height than column 56. Each of a pair of equal length beams 58 and 60 has a first end slidably journaled into a separate one of the columns 54 and 56 so as to extend horizontally across the base 52 in spaced relationship thereabove. Referring to FIG. 3, the beams 58 and 60 each have a second end attached to an opposite end of the ends of a cup-shaped guide rail 62.

As seen in FIG. 2, the base 52 of the soldering machine 46 mounts a solder pot 64 containing a quantity of molten solder. The solder pot 64 has an associated pump 66 which is driven via a belt 68 from a variable speed motor 70. The pump 66 forces solder from the pot 64 into a spout 72 which, as shown in FIG. 3, extends upwardly from the pot at an angle into the region bounded by the beams 58 and 60 and the guide rail 62. The spout 72 is of such a height that its top 74 extends above the column 56 and a portion of the guide rail 62.

Referring to FIG. 3, the top 74 of the spout 72 is connected to a first end of a nozzle 76 which extends horizontally from the top of the spout so as to cross over the guard rail 62. The nozzle 76 has a second end, distant from the spout 72, which is provided with a downwardly directed outlet 78 parallel to the columns 54 and 56. As seen in FIG. 3, when molten solder is pumped from the solder pot 64 of FIG. 2, through the spout 72 and into the nozzle 76 by the pump 66 of FIG. 2, a stream 80 of molten solder is discharged from the outlet 78 towards the base 52.

A second nozzle 82 is secured to the nozzle 76 via a bracket 84 so as to be parallel thereto but spaced therefrom. The nozzle 82 has a downwardly directed outlet 86 which is spaced from the guide rail 62 approximately the same distance as the outlet 78. The nozzle 82 is coupled to a supply (not shown) of a wetting agent, typically liquid flux. When the liquid flux is forced into the nozzle 82 under pressure, then a stream 88 of flux droplets is discharged from the outlet 86 parallel to the stream 80 of molten solder.

Soldering of the toes 40 of the edge connector contacts 38 to the metallized pads 42 on each of the surfaces 12 ands 14 of the circuit board 10 is accomplished in the following manner. First, the robot 50 of FIG. 2 engages an "unsoldered" circuit board 10 at a storage site 92. An "unsoldered" circuit board is defined as a board which carries an edge connector 16 whose toes 40 (see FIG. 1) have yet to be soldered to a corresponding one of the metallized pads 42 (see FIG. 1). Once the robot 50 has engaged the circuit board 10, the board is then tilted by the robot approximately 20° from the horizontal so that one end of the edge connector 16, as well as one end of each of the rows of toes 40, is at a higher elevation than the other end thereof. Referring to FIG. 3, the unsoldered circuit board 10 is then brought to the soldering machine 46 so that the lower end of the edge connector 16 on the board abuts the guide rail 62 at a point in between the outlet 86 and the column 54.

Figure 4:
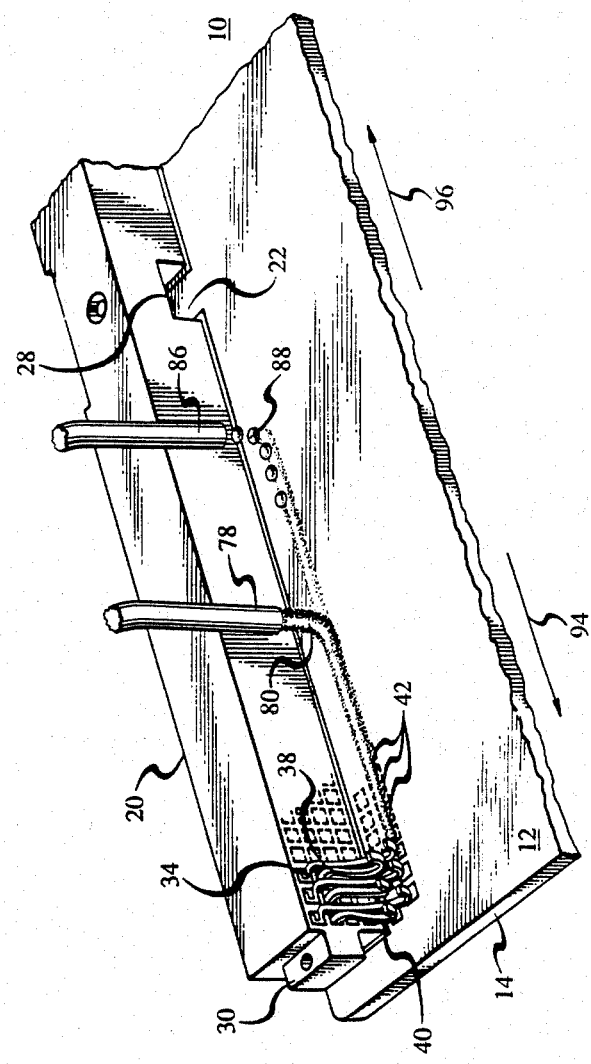
FIG. 4 is partial perspective of the circuit board of FIG. 1 illustrating how the toes of the edge connector contacts are soldered to the metallized pads by the soldering machine of FIGS. 2 and 3.

Next, the unsoldered circuit board 10 is displaced by the robot 50 along a path 94 inclined with respect to the horizontal and parallel to the rows of pads 42 on the circuit board 10, so the toes 40 and the metallized pads contiguous therewith successively pass underneath the outlets 86 and 78. As the unsoldered circuit board 10 travels along the path 94, the stream 88 of flux droplets is pumped through the outlet 86 at a fast dripping rate whereas the stream 80 of molten solder is pumped through the outlet 78 at a relatively slow steam rate. In practice, the streams 80 and 88 of solder and flux droplets are of a volume sufficient to cover the combined width of the rows of pads 42 on the circuit board 10 so that the toes 40 in each row and each of the metallized pads contiguous therewith will be successively coated during a single pass of the circuit board 10 past the outlets 78 and 86. Referring now to FIG. 4, as the circuit board 10 is displaced along the path 94, the outlet 78 lies upstream of the outlet 86 so that each of the toes 40 and the metallized pads 42 contiguous therewith are coated with flux prior to being coated with solder.

Turning to FIG. 3, once the toes 40 and the metallized pads 42 of FIG. 1 have been successively coated first with flux and then with molten solder, the rate at which flux is pumped through the nozzle 82 is decreased. After the flow rate of the flux has been changed, the direction of the travel of the circuit board 10 is reversed so the board travels along an upwardly inclined path 96 directly opposite the path 94. Now, the toes 40 and the metallized pads 42 are successively coated first with molten solder and then with the flux droplets.

Referring now to FIG. 4, as the circuit board 10 travels along the inclined paths 94 and 96, the molten solder which contacts the board 10 will run downwardly, under the force of gravity, successively past each of the toes 40 and the metallized pads 42 contiguous therewith. The force of gravity on the molten solder, together with the presence of the flux on the toes 40, is sufficient to break the surface tension of the solder which would otherwise cause it form a bridge between an adjacent pair of toes in each row. Thus, the formation of solder bridges between each adjacent pair of the toes 40 is avoided. However, the capillary force exerted by each toe 40 and the metallized pad 42 in contact therewith is sufficient to cause a small solder fillet to remain between the toe and pad.

Once the metallized pads 42 on a first of the major surfaces 12 and 14 are soldered to the toes 40 contiguous therewith, the circuit board 10 is inverted so that the pads on the other surface can be soldered to the toes contiguous therewith in the above-described manner. Referring to FIG. 3, after, the metallized pads 42 on each of the major surfaces 12 and 14 of the circuit board 10 have been soldered to the corresponding toes 40 contiguous therewith, the circuit board is then transported by the robot 50 from the soldering machine 46 to the cleaning station 48 for cleaning. Following cleaning, the circuit board 10 is then transported by the robot 50 to a second storage site (not shown). Then, another unsoldered circuit board 10 is engaged by the robot 50 and the above-described soldering process is repeated.

As may be appreciated, the above-described soldering technique is well suited for soldering each of a plurality of members (e.g., the edge connector toes 40) arranged in one or more rows, to a corresponding one of a plurality of metallized areas (e.g. the pads 42) on major surface of a substrate (e.g. the circuit board 10) in a simple, automated manner. In practicing the method of the present invention, it is possible to employ a conveyor (not shown) rather than the robot 50 to displace the circuit board 10 along the downwardly and upwardly inclined paths 94 and 96, respectively, past the outlets 78 and 86. Also, in some circumstances, it may be desirable to provide a vacuum nozzle (not shown) in line with the outlets 78 and 86 to remove excess flux and solder. Further, when the rows of metallized pads 42 do not extend fully across each of the surfaces 12 and 14 a distance equal to the length of the edge connector housing 20, it may be useful to provide a metallized path (not shown) on each circuit board surface within the gap between the metallized pads in a given row to allow the solder to flow under gravity across the gap.

In addition, it should be understood that it is not absolutely necessary to displace the circuit board 10 both downwardly and upwardly along an inclined path past the outlets 78 and 86 to solder the toes 40 to the metallized pads 42. Rather, it is only necessary to transport the circuit board 10 once along the inclined path successively past the outlets 78 and 86 so that the toes 40 and metallized areas 42 contiguous therewith are successively coated first with solder and then with the flux droplets. However, it is desirable to first transport the circuit board 10 along an inclined path successively past the outlets 86 and 78 to intially coat the toes 40 and metallized pads 42 with flux prior to the application of any solder thereto. This step of "pre-fluxing" the circuit board 10 could, however, be practiced on other equipment, rather than the soldering machine 46.

It is to be understood that the that the above-described embodiments are merely illustrative of the principles of the invention. Various modifications and changes may be made thereto by those skilled in the art which will embody the principles of the invention and fall within the spirit and scope thereof.

What is claimed is:

1. A method of fabricating an article comprising the steps of:
    bonding each of a plurality of spaced members, arranged in at least one row, to each of a plurality of metallized areas on a substrate contiguous therewith; and
    completing the fabrication of said article, characterized in that said bonding step comprises the steps of:
    tilting the substrate so that one end of the row of members, and the metallized pads contiguous therewith, are at a higher elevation than the other end thereof;
    directing a stream of bonding material and a stream of wetting agent downwardly onto the substrate towards the regions where the members are contiguous with the metallized pads on the substrate; while
    simultaneously imparting a relative motion between the substrate and the streams so that the substrate traverses the streams along a path inclined with respect to the horizontal and parallel to the row of pads on the substrate, the inclination of the substrate relative to the horizontal being such as to cause the bonding material and the wetting agent to flow, under the force of gravity, past a successive one of the members and pads in the row.

2. The method according to claim 1, characterized in that said step of imparting a relative motion includes the steps of:
    displacing the substrate in a first direction along the inclined path so that members and metallized pads contiguous therewith are successively coated with the wetting agent and then the bonding material; and
    displacing the substrate along the inclined path in a second direction opposite to the first direction so that the members and the metallized pads in contact therewith are successively coated with the bonding material and then the wetting agent.

3. The method according to claim 1, characterized in that the bonding material is molten solder.

4. The method according to claim 1, characterized in that the wetting agent is liquid flux.

5. A method of fabricating an article comprising the steps of:
    soldering each of a plurality of spaced contacts extending from a connector in a plurality of spaced rows to a separate one of a plurality of metallized pads on a circuit board arranged so each pad is contiguous with a corresponding contact; and
    completing the fabrication of the article, characterized in that said soldering step comprises the steps of:
    tilting the circuit board and the connector so that one end of each of the rows of contacts on the connector and the metallized pads on the circuit board contiguous therewith is at a higher elevation than the other end thereof;
    directing a stream of solder and a stream of flux downwardly onto the circuit board towards the regions where the contacts are contiguous with the metallized pads on the circuit board; while
    simultaneously imparting a relative motion between the circuit board and the streams so that the circuit board traverses the streams along a path inclined with respect to the horizontal and parallel to the row of metallized pads on the circuit board, the inclination of the circuit board relative to the horizontal being such to cause the solder and the flux to flow, under the force of gravity, past a successive one of the contacts and metallized pads in each row.

6. The method according to claim 5, characterized in that said step of imparting a relative motion includes the steps of:
    displacing the circuit board in a first direction along the inclined path so that the contacts and metallized pads contiguous therewith are successively coated with the flux and then the solder; and
    displacing the circuit board along the inclined path in a second direction opposite to the first direction so that the contacts and the metallized pads in contact therewith are successively coated with the solder and flux.

7. Apparatus for bonding each of a plurality of members, arranged in at least one row, to a separate one of a plurality of metallized pads on a substrate, each pad being contiguous with a corresponding member, characterized in that said apparatus includes:
    means for tilting the substrate so that one end of the row of members and the metallized pads contiguous therewith is at a higher elevation than the other end;
    means for directing a stream of bonding material and wetting agent downwardly towards the substrate into the regions where the members are contiguous with the pads; and
    means for imparting a relative motion between the streams and the substrate so that the substrate traverses the streams along a path inclined with respect to the horizontal and parallel to the row of metallized pads on the substrate, the inclination of the substrate being such that the bonding material and wetting agent flow downwardly, under the force of gravity, successively past each of the members in the row and the pads contiguous therewith.

8. The apparatus according to claim 7, characterized in that said means for tilting the substrate and for imparting a relative motion comprise a robot.

* * * * *